United States Patent [19]
Giroux

[11] Patent Number: 4,695,038
[45] Date of Patent: Sep. 22, 1987

[54] MEANS FOR PULLING FIBER OPTIC CABLE THROUGH A CONDUIT

[76] Inventor: D. William Giroux, 3 Lakewood Villa, Lake Manawa, Council Bluffs, Iowa 51501

[21] Appl. No.: 899,321

[22] Filed: Aug. 22, 1986

[51] Int. Cl.$^4$ .............................................. E21C 29/16
[52] U.S. Cl. ......................................... 254/134.3 FT
[58] Field of Search ............... 242/86.5; 254/291, 292, 254/134.3 R, 134.3 FT, 134.3 PA; 91/520, 449

[56] References Cited

U.S. PATENT DOCUMENTS

| 3,688,648 | 9/1972 | D'Amato | 91/520 |
| 3,774,696 | 11/1973 | Horsch | 91/520 |
| 4,023,466 | 5/1977 | Strassheimer | 91/449 |
| 4,152,970 | 5/1979 | Hall et al. | 91/449 |
| 4,202,250 | 5/1980 | Zevner et al. | 91/449 |
| 4,343,151 | 8/1982 | Lorimor | 91/520 |
| 4,345,736 | 8/1982 | Zevner et al. | 91/449 |
| 4,427,207 | 1/1984 | Gafford | 91/520 |
| 4,456,225 | 6/1984 | Lucas | 254/134.3 R |

FOREIGN PATENT DOCUMENTS 2526734 6/1975 Fed. Rep. of Germany ...... 254/291

Primary Examiner—Robert C. Watson
Attorney, Agent, or Firm—Zarley, McKee, Thomte, Voorhees & Sease

[57] ABSTRACT

A means for pulling a length of fiber optic cable through an underground conduit is described wherein a lead puller is positioned at the exit of the conduit and one or more booster pullers are positioned at intermediate positions along the length of the conduit upstream from the exit thereof. The booster puller pulls the cable from the cable entry to the intermediate location and the cable is then fed downstream into the conduit with the lead puller being simultaneously operated to pull the conduit from the intermediate location to the exit. The lead and booster pullers each have a pair of hydraulically operated pinch wheels mounted thereon which may be selectively series connected or connected in parallel to achieve either maximum speed or maximum torque.

6 Claims, 12 Drawing Figures

MEANS FOR PULLING FIBER OPTIC CABLE THROUGH A CONDUIT

BACKGROUND OF THE INVENTION

This invention relates to an improved method and means for pulling great lengths of fiber optic cable through a buried or underground conduit.

Fiber optic cable is comprised of a bundle of glass fibers or other transparent material enclosed within a protective outer sheath. The fiber optic cable is normally wound upon reels which are transported to the job site by reel haulers, trucks, etc. The fiber optic cable is normally pulled through the underground conduit by means of a rope connected at one end thereof to the lead end of the fiber optic cable. The rope is normally pulled through the conduit by some sort of pulling apparatus. The friction of the fiber optic cable being pulled through the conduit has heretofore limited the lengths of the cable which could be pulled due to the tension limits or strength of the cable. Such pulling limitations resulted in the necessity of splicing together shorter lengths of the fiber optic cable which is time consuming and expensive. In addition, the transmission quality of the cable is affected by a large number of splices.

An attempt was made to solve the problems associated with pulling long runs of fiber optic cable and the same is described in U.S. Pat. No. 4,576,362 issued to Ralph C. Langston on Mar. 18, 1986. In the Langston apparatus, a first cable puller is positioned at the conduit exit with a second pulling apparatus being provided at an intermediate access point along the length of the conduit through which the cable is being pulled. Both of the pulling machines of the Langston patent involve capstan winches. The Langston method utilizes a positive pull by the lead puller to tighten the cable on the booster capstan drive. The Langston method requires approximately sixteen percent of the booster pulling tension to snub the cable on the booster capstan. Therefore, a cable that requires 600 pounds pull to move must be snubbed with approximately 100 pounds pull to obtain proper friction on the booster capstan drive. On an optic fiber cable pull of considerable length, any additional drag at the inlet of the conduit will be amplified about five times at the outlet. Therefore, a drag of 100 pounds to snub the booster capstan may require 500 pounds extra pull by the lead puller. Therefore, on pulls of considerable length, the effective pull required by the lead puller that snubs the cable on the booster capstan may be cut to below one-fourth. A further disadvantage of the Langston method is that the fiber optic cable must be coiled on the booster puller which results in cable twisting when the cable is removed from the booster puller.

SUMMARY OF THE INVENTION

The apparatus of this invention comprises a wheeled frame means having an internal combustion engine mounted thereon which is connected to a hydraulic pump means. Mounted at the rear of the wheeled frame means is a pivotal reel carrier on which may be mounted a fiber optic cable reel as desired. Also mounted on the reel carrier are a pair of pinch wheels which are rotatably mounted about horizontal axes in such a manner so that the peripheries of the pinch wheels are closed adjacent one another. Each of the pinch wheels is powered by a hydraulic motor which is operatively connected to the hydraulic pump. A valve interconnects the hydraulic pump and the hydraulic motors on the pinch wheels so that the pinch wheels may be either powered by the hydraulic fluid in series or in parallel. When the hydraulic motors are series connected, the pinch wheels will be operated at maximum speed. When the hydraulic motors are connected in parallel by the valve, the pinch wheels will be operated at less speed than when series connected but will have increased torque for pulling power.

Figure 8:
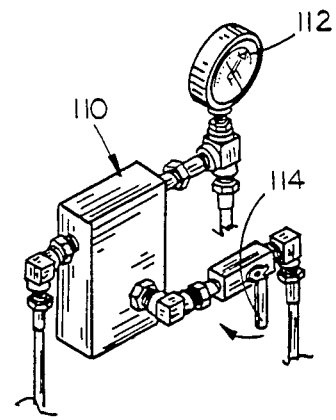
FIG. 8 is a perspective view illustrating a relief valve means and a by-pass valve means.

When the apparatus is being used to pull rope through the conduit, with one end of the rope being connected to the fiber optic cable, the rope is wrapped around both of the pinch wheels in a "FIG. 8" pattern and is then delivered to rope tender canisters positioned on the wheeled frame means. When the apparatus is used as a booster puller at an intermediate access point, the fiber optic cable is wrapped around one of the pinch wheels so that the pinch wheel will pull the fiber optic cable from the conduit entry towards the intermediate access opening. The workman is positioned at the booster puller and grasps the cable and thence feeds the cable into the downstream portion of the conduit at the intermediate access opening.

It is a principal object of the invention to provide an improved method and means for pulling fiber optic cable through an underground conduit.

A further object of the invention is to provide a fiber optic cable puller having a pair of pinch wheels which are hydraulically connected in series or in parallel to achieve either maximum speed or maximum torque depending upon the position of the valve connecting the hydraulic motors with the hydraulic pump.

Yet another object of the invention is to provide a method and means for pulling fiber optic cable through an underground conduit in such a manner so that great lengths of the cable may be pulled without stalling the equipment or without damaging the cable, by having an adjustable limit which can be set on the puller as to not exceed the allowable tension of the cable.

Yet another object of the invention is to provide a puller which has greater pulling power than normally allowed for pulling fiber optic cable to be used for pulling "innerduct" through a conduit.

Still another object of the invention is to provide an apparatus of the type described which may be used as a lead puller to pull rope through the conduit or which may be used as a booster puller to pull the fiber optic cable through the conduit.

These and other objects will be apparent to those skilled in the art.

DESCRIPTION OF THE PREFERRED EMBODIMENT

Figure 1:
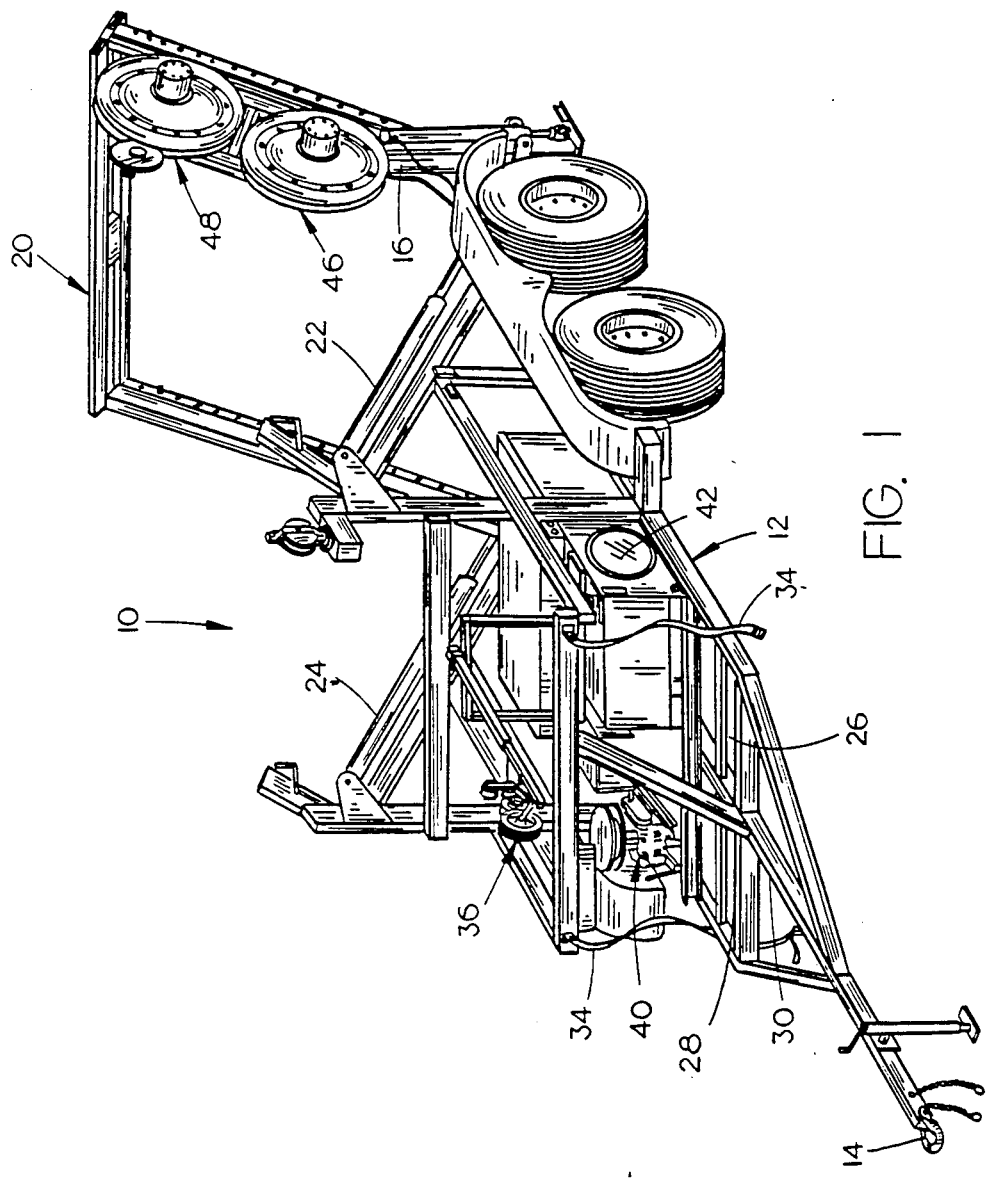
FIG. 1 is a front perspective view of the pulling apparatus of this invention.

The cable reel puller and carrier is illustrated in FIG. 1 and is generally designated by the reference numeral 10. Puller 10 includes a wheeled frame means 12 having a hitch 14 at the forward end thereof. A pair of hydraulically operated stabilizing jacks or stabilizers 16 and 18 (not shown) are mounted at the rearward end of the wheeled frame means 12.

Figure 2:
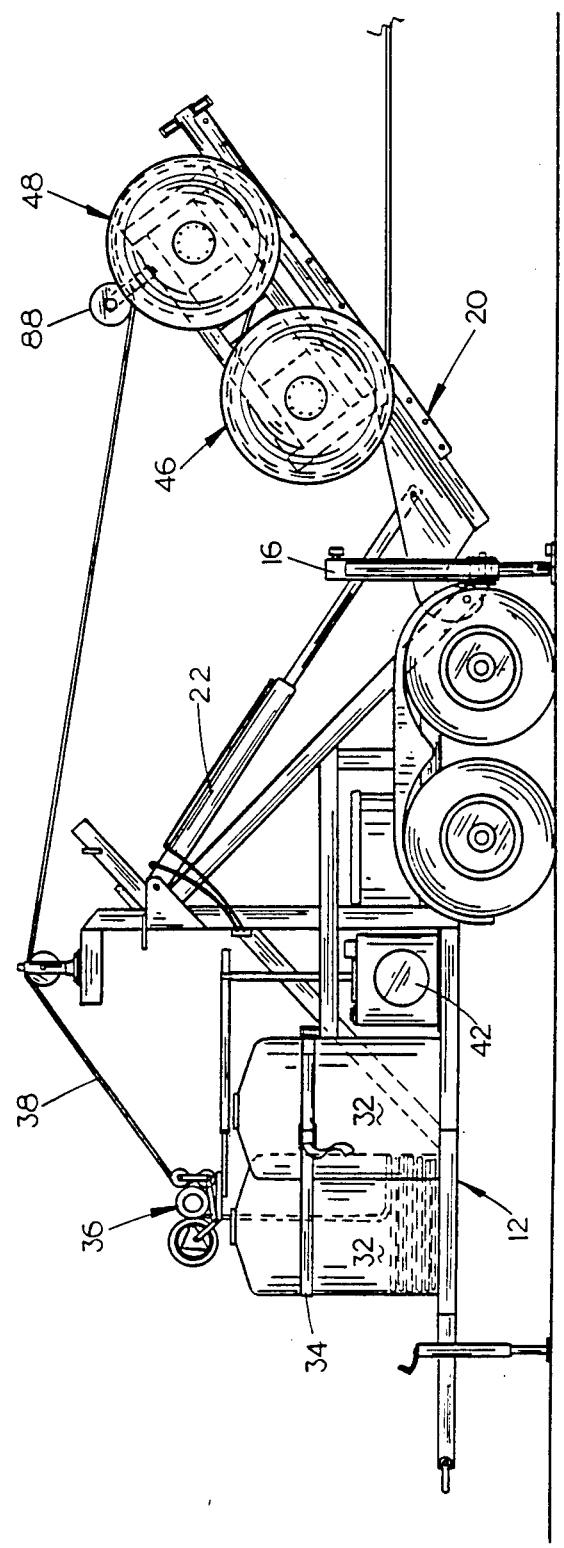
FIG. 2 is a side view of the puller apparatus being employed to pull a rope which would normally be connected to a fiber optic cable.
Figure 3:
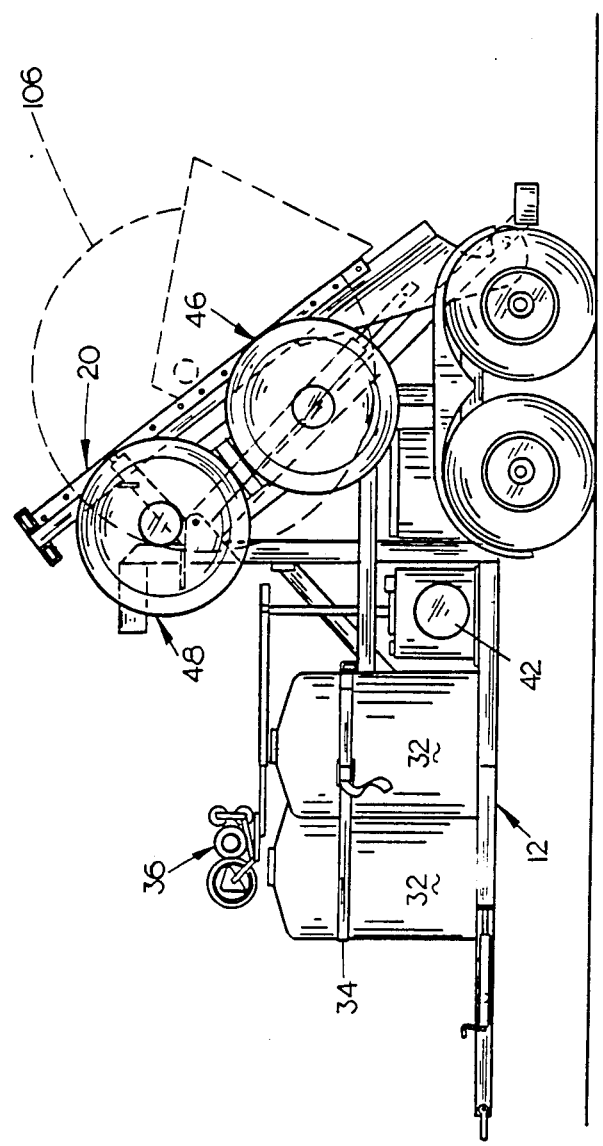
FIG. 3 is a side view similar to FIG. 2 except that the pinch wheel support and reel supports have been pivotally moved to a travel position, with the broken lines indicating a reel support stand and cable reel in a transport position.

A reel support 20 is pivotally mounted at the rearward end of the wheeled frame means 12 for moving the reel support 20 from the transport position of FIG. 3 to the pulling position of FIG. 2 by means of the pair of hydraulic cylinders 22 and 24.

Frame means 12 is provided with three rope canister support areas 26, 28 and 30 (FIG. 1) at its forward end adapted to have rope canisters 32 mounted thereon and maintained thereon by means of strap assembly 34 as best illustrated in FIGS. 2 and 3.

A rope tender apparatus 36 is mounted on the frame means 12 (FIG. 2) for delivering the rope 38 into the interiors of the canisters in a manner similar to that described in U.S. Pat. No. 4,465,261.

Figure 4:
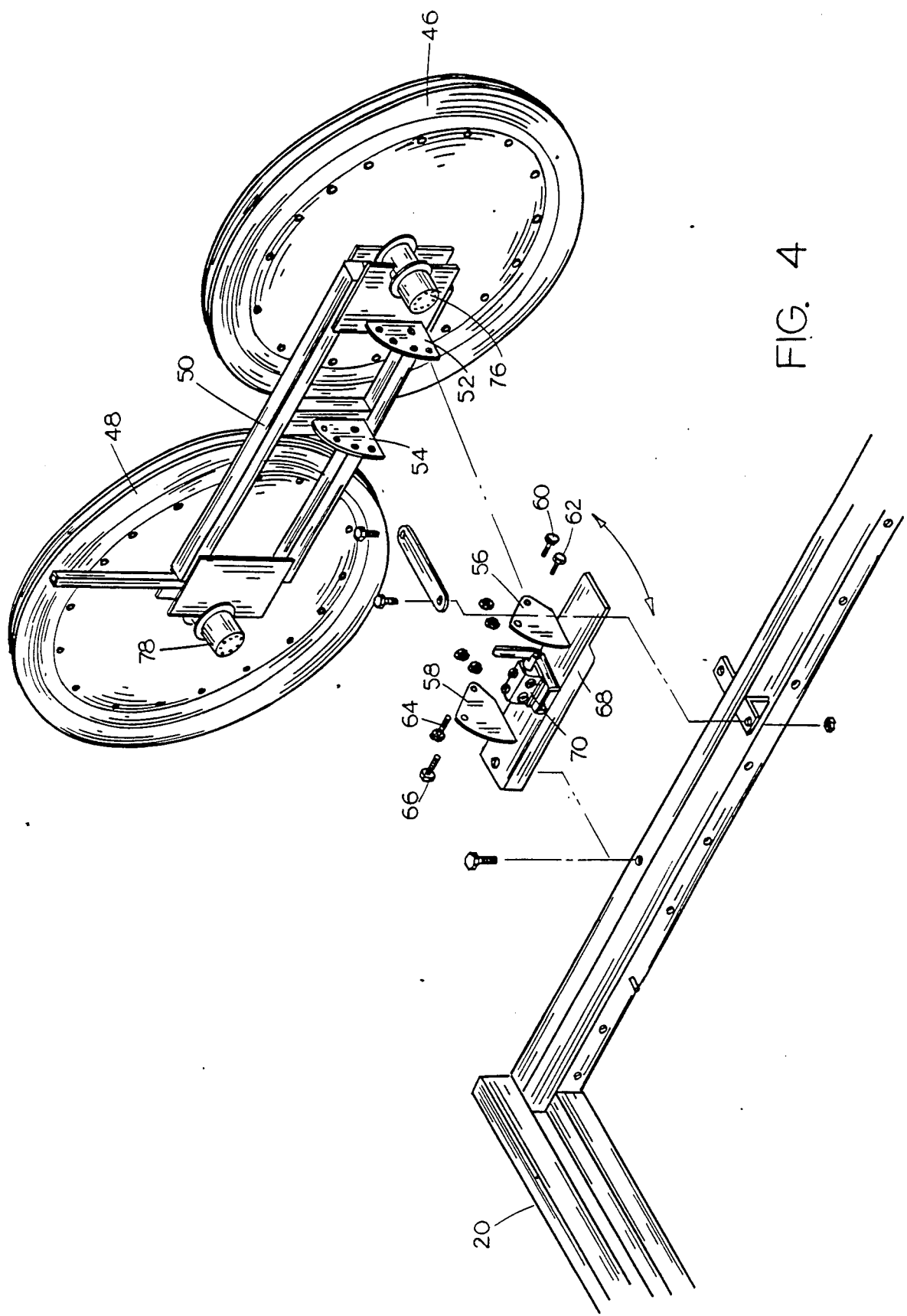
FIG. 4 is an exploded perspective view of the pinch wheels of this invention.
Figure 5:
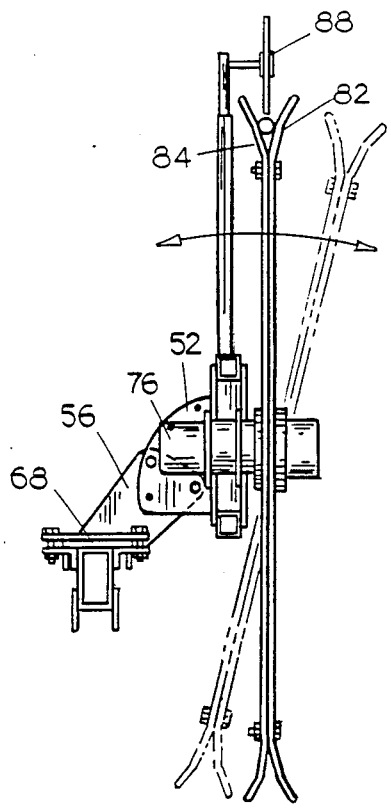
FIG. 5 is an end view of one of the pinch wheels with the broken lines indicating the alternate position of the pinch wheels.

The numeral 40 refers to a power source such an internal combustion engine which is operatively connected to a hydraulic pump 42. Hydraulic pump 42 provides hydraulic fluid for the operation of cylinders 22, 24, 16, 18 as well as the hydraulic motor on the rope tender 36. Hydraulic pump 42 also delivers hydraulic fluid under pressure to the pinch wheels 46 and 48 which are operatively rotatably mounted on the reel support 20 as best illustrated in FIG. 4. As seen in FIG. 4, pinch wheels 46 and 48 are operatively rotatably mounted on a frame 50 having a pair of arcuate mounting brackets 52 and 54 extending inwardly therefrom which are adapted to be selectively pivotally secured to the plates 56 and 58 by means of bolts 60, 62 and 64, 66 respectively. As seen in FIG. 5, the pinch wheels may be angularly disposed with respect to the vertical by changing the relationship of the brackets 52 and 54 with respect to the plates 56 and 58.

Figure 6:
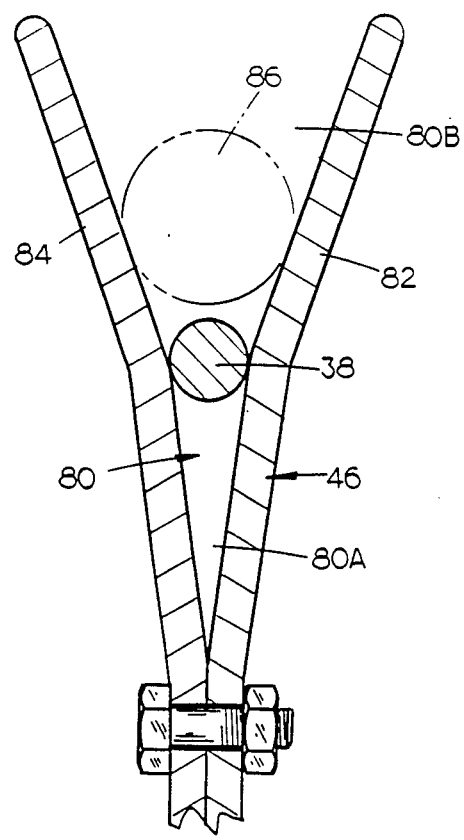
FIG. 6 is an enlarged partial sectional view of the peripheral portion of the pinch wheel.
Figure 7:
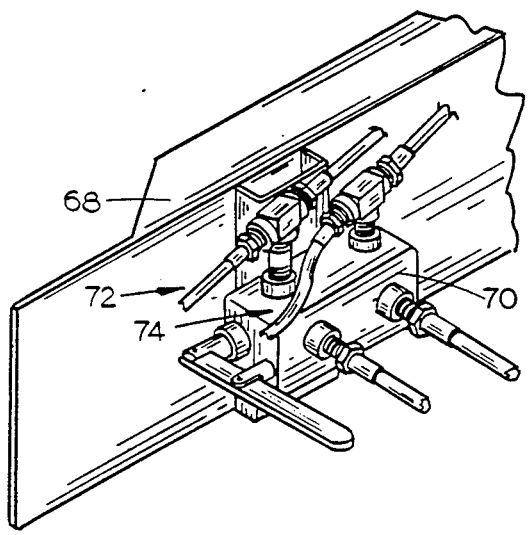
FIG. 7 is a perspective view of the valve means which permits the hydraulic motors on the pinch wheels to be either series connected or connected in parallel.
Figure 9:
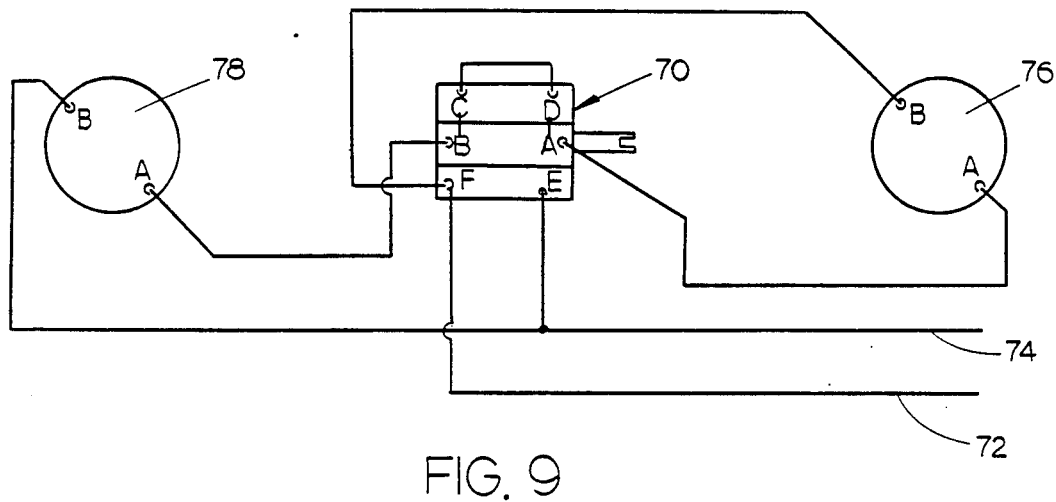
FIG. 9 is a schematic of the hydraulic circuitry of the pinch wheels illustrating the pinch wheels being operated in series.
Figure 10:
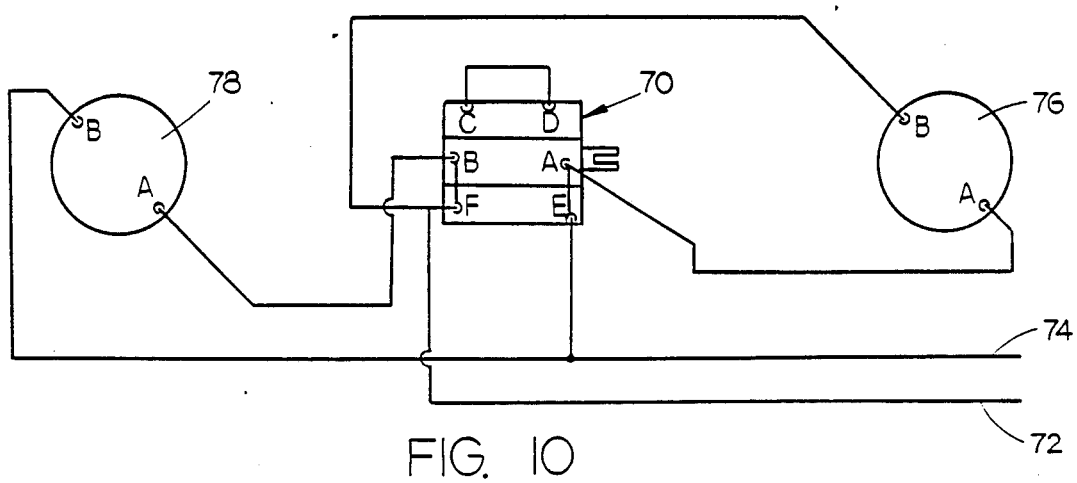
FIG. 10 is a view simliar to FIG. 9 except that the valve means has been switched so that the hydraulic motors on the pinch wheels are fluidly connected in parallel.

Plates 56 and 58 are mounted on a frame member 68 which is pivotally secured to reel support 20 by bolt assemblies as illustrated in FIG. 4 to permit adjustment of the pulling angle. Valve 70 is mounted on the frame member 68 between the plates 56 and 58 and is hydraulically connected to the hydraulic pump by conduits 72 and 74. Pinch wheels 46 and 48 are powered by hydraulic motors 76 and 78 as illustrated in FIGS. 9 and 10. FIG. 9 illustrates hydraulic motors 76 and 78 being series connected so that the motors 76 and 78 be operated at a maximum speed. When valve 70 is shifted from the position of FIG. 9 to the position of FIG. 10, the motors 76 and 78 are connected in parallel so that the motors 76 and 78 will be operated at a slower speed than when series connected but will have a much greater torque or pulling power when connected in parallel. As seen in the drawings, the pinch wheels 46 and 48 are each provided with a V-shaped peripheral gripping portion 80 comprised of portions 80A and 80B which is best illustrated in FIG. 6. In FIG. 6, the numeral 38 illustrates the pulling rope 38 being received in the pinch groove 80A defined by the flanges 82 and 84. The broken lines in FIG. 6 illustrate the position of a fiber optic cable 86 being received in portion 80B. The double groove angle of the flanges 82 anad 84 permits the proper gripping of the rope 38 in portion 80A and the cable 86 in portion 80B. In the drawings, the numeral 88 refers to an idler wheel adapted to maintain the rope 38 in the pinch groove of pinch wheel 48.

When it is desired to pull a long length of cable 86 through an underground conduit 90, an excavation 92 is created in the ground at the location from which the cable is to be pulled. For purposes of description, the entry of the conduit 90 will be identified by the reference numeral 94 as seen in FIG. 12.

At least one excavation 96 is formed in the ground downstream from excavation 92 and the conduit 90 will be cut at 90 and 100 respectively. An exit excavation 102 is formed in the ground at the location to which the cable is to be pulled. For purposes of description, the numeral 104 refers to the exit end of the conduit 90.

Figure 12:
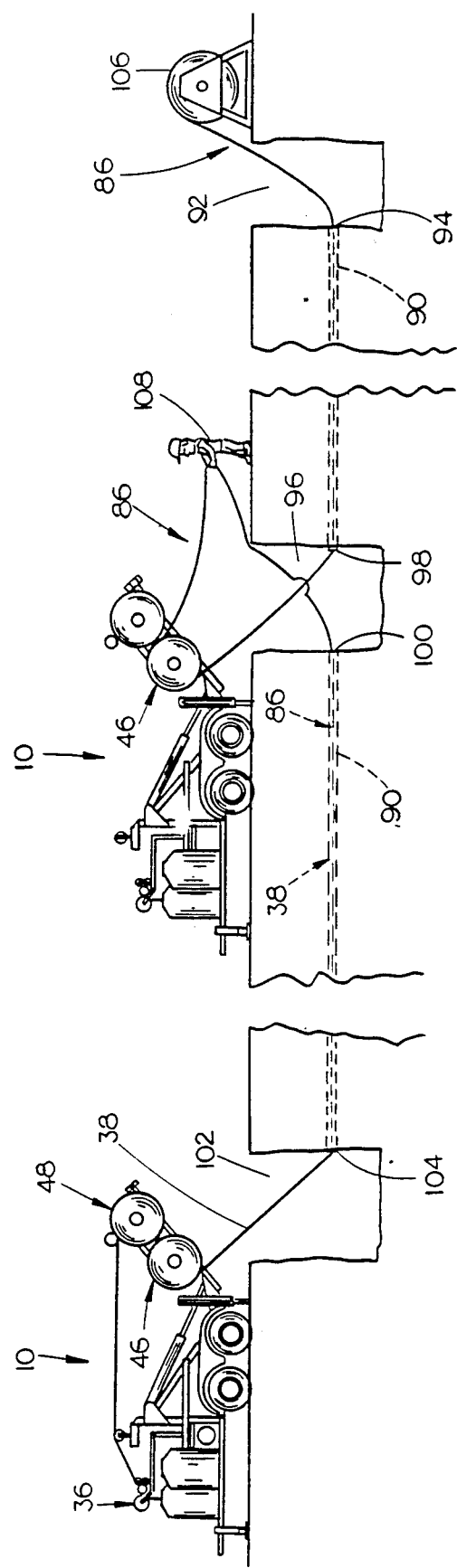
FIG. 12 is a schematic view illustrating a lead puller and a booster puller being used to pull cable through an underground circuit.

A booster puller 10 is positioned adjacent the intermediate excavation 96 as illustrated in FIG. 12. A suitable cable reel 106 will be positioned at the entry excavation. A lead or primary puller 10 is positioned adjacent excavation 102 but does not have to be so positioned until it is required to pull the rope 38 from excavation 96 to excavation 102. A length of rope 38 is then blown or otherwise passed through the that portion of conduit 90 between excavation 96 and excavation 92. The "tail" end of the rope 38 is secured to one end of the fiber optic cable 86 wound on the reel 106. The lead end of the rope 38 is passed around the pinch wheel 46 as illustrated in FIG. 2 and thence passed around the pinch wheel 48 as also illustrated in FIG. 2. The lead end of the rope 38 is then positioned in the rope tender apparatus 36 so that as the rope 38 is being pulled by the pinch wheels 46 and 48, the rope will be deposited in the canisters 30 and 32.

Figure 11:
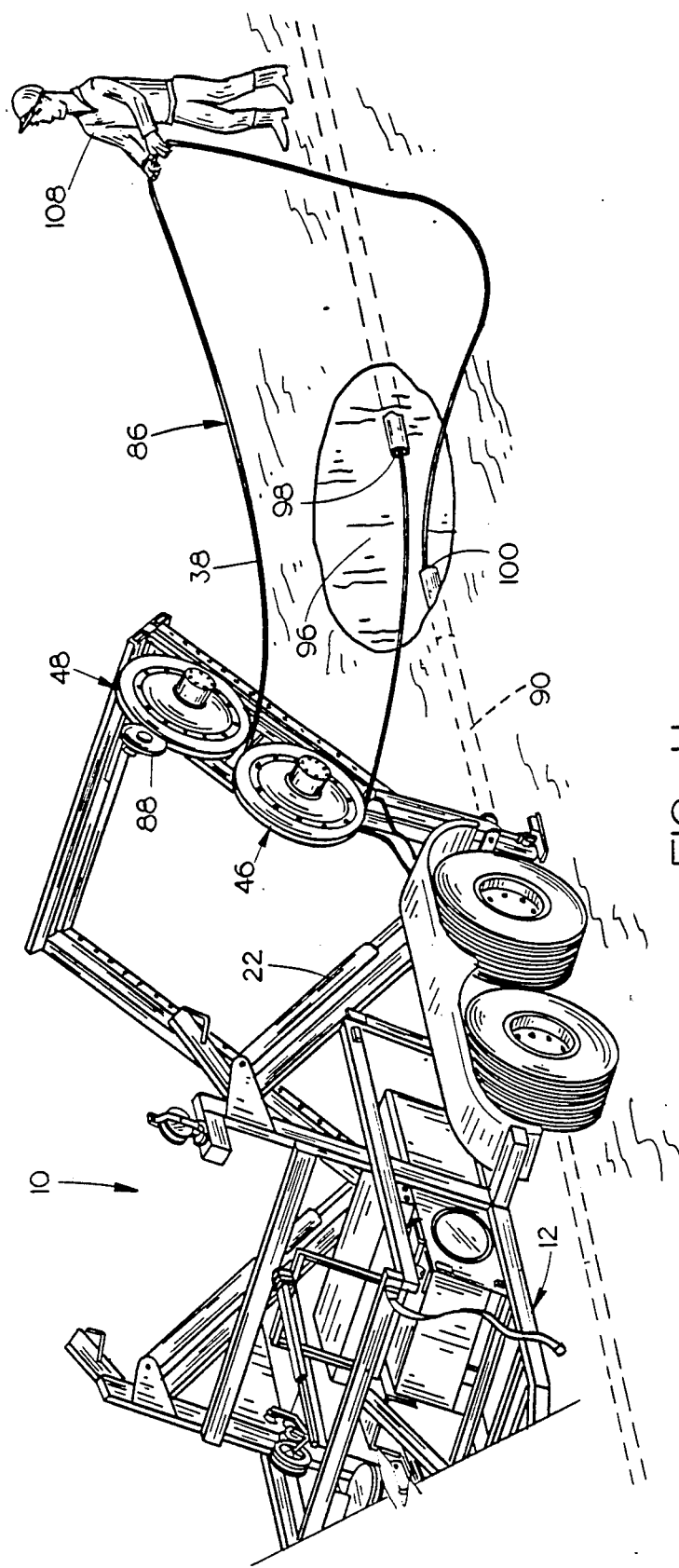
FIG. 11 is a view illustrating the apparatus of this invention being used as a booster puller at a booster location.

Puller 10, at excavation 96, will then be activated so that the pinch wheels 46 and 48 will be rotated in opposite directions to pull the rope through the conduit 90 between excavations 92 and 96 which will cause the conduit 86 to be pulled through the conduit 90 from the entry opening 94 in excavation 92 to the intermediate excavation 96. When the lead end of cable 86 reaches excavation 96, the rope 38 is disconnected therefrom and the cable 86 is wrapped around pinch wheel 46 as illustrated in FIG. 11. If a rope 38 has not been blown or otherwise passed through the conduit 90 between excavations 102 and 96, the same is accomplished at this time. The tail end of the rope 38 is secured to the lead end of the cable 86 at excavation 96 and the rope 38 as seen in FIG. 12. At this time, the puller 10 at excavation 102 becomes the lead puller and the puller 10 at excavation 96 becomes the booster puller. As the cable 86 passes around the pinch wheel 46 at excavation 96, the workman controls the slack in the cable as required to coordinate the pull speed between the lead puller and the booster puller. The workman feeds the cable into the opening 100 as illustrated in FIG. 11. Thus, booster puller 10 is pulling the cable between the entry excavation 92 and the intermediate excavation 96 while the lead puller pulls the cable from the intermediate excavation 96 to the exit excavation 102.

It can therefore be seen that a novel method and means has been provided for pulling great lengths of fiber optic cable through an underground conduit through the use of a lead puller and one or more booster pullers upstream of the lead puller. The valve 70 may be shifted as desired to either obtain maximum speed or maximum pulling power depending upon whether the hydraulic motors 76 and 78 are series connected or are connected in parallel.

FIG. 8 illustrates an adjustable relief valve 110 which is imposed in the hydraulic circuitry between the hydraulic pump and the pull motors 76 and 78. Valve 110 is adjusted with a conventional tension meter prior to the pulling operation so that the hydraulic fluid will by-pass the pull motors 76 and 78 when the maximum tension is reached so that the motors 76 and 78 will stall out before the allowable tension is reached in the cable 86. A hydraulic gauge 112 is provided in the circuit so that the hydraulic pressure to the motors 76 and 78 can be monitored during the pull with the indicated pressure being directly related to the pull on the cable.

If the puller is being used to pull innerduct through a conduit prior to pulling cable, the by-pass valve 114 may be operated to by-pass the relief valve so that sufficient hydraulic pressure can be supplied to the motors 76 and 78 to pull the innerduct through the conduit.

I claim:

1. A pulling machine, comprising, a frame means, first and second puller pinch wheels rotatably mounted on said frame means adapted to have a flexible line means extending around, a first hydraulic motor operatively connected to said first puller pinch wheel for rotating said first puller pinch wheel in a first direction, a second hydraulic motor operatively connected to said second puller pinch wheel for rotating said second puller pinch wheel in a second direction which is opposite to said first direction, a hydraulic pump means operatively connected to said first and second hydraulic motors for rotating the same, and a valve means operatively connected to said pump means and said first and second hydraulic motors for selectively supplying hydraulic fluid to said first and second motors in either a series manner or in a parallel manner, said first and second motors being operated, when series connected, at a greater speed but with less pulling power than when said first and second motors are connected in parallel.

2. The pulling machine claim 1 wherein said first and second puller pinch wheels are positioned closely adjacent each other.

3. The pulling machine of claim 2 wherein said puller pinch wheels are selectively pivotally mounted on said frame means to permit said puller pinch wheels to be aligned with the direction of pull.

4. The pulling machine of claim 3 wherein an adjustable relief valve means is operatively fluidly connected to said first and second hydraulic motors so that hydraulic fluid will not be supplied to said motors when a predetermined hydraulic pressure is experienced by said motors.

5. The pulling machine of claim 4 wherein a manually operated by-pass valve means is operatively fluidly connected to said relief valve means and said motors for by-passing said relief valve means at times.

6. The pulling machine of claim 1 wherein each of said puller pinch wheels have a double angle peripheral groove provided thereon.

* * * * *